United States Patent [19]
Johnson

[11] 3,762,482
[45] Oct. 2, 1973

[54] MARKER FOR FARM IMPLEMENT

[76] Inventor: Leroy E. Johnson, 506 1st St. S. W., Stanley, N. Dak. 58784

[22] Filed: June 14, 1971

[21] Appl. No.: 152,863

[52] U.S. Cl. ............................... 172/126, 172/132
[51] Int. Cl. .............................................. A01h 17/00
[58] Field of Search ..................... 172/126–132, 311

[56] References Cited
UNITED STATES PATENTS

| | | | |
|---|---|---|---|
| 3,176,779 | 4/1965 | Schneider | 172/126 |
| 2,871,028 | 1/1959 | Hibbard | 172/311 X |
| 3,524,508 | 8/1970 | West | 172/126 |
| 642,038 | 1/1900 | Frank | 172/132 |
| 2,331,730 | 10/1943 | Rusco | 172/127 |

FOREIGN PATENTS OR APPLICATIONS

| | | | |
|---|---|---|---|
| 9,610 | 9/1927 | Australia | 172/126 |
| 208,782 | 7/1954 | Australia | 172/311 |
| 117,491 | 9/1952 | Australia | 172/311 |

Primary Examiner—Robert E. Pulfrey
Assistant Examiner—R. T. Rader
Attorney—Merchant & Gould

[57] ABSTRACT

The marker includes a spacer bar secured at one end to the side of a farm implement by a universal joint. Mounted on the other end of the spacer bar is a wheel mounting bar forming a T-shape with the spacer bar. A pair of ground engaging caster wheel assemblies are mounted on the ends of the wheel mounting bar to perform the marking function. A chain is connected between the spacer bar and a forward portion of the frame to hold the marker in position. When the chain is released, the marker is free to move to a trailing position.

4 Claims, 6 Drawing Figures

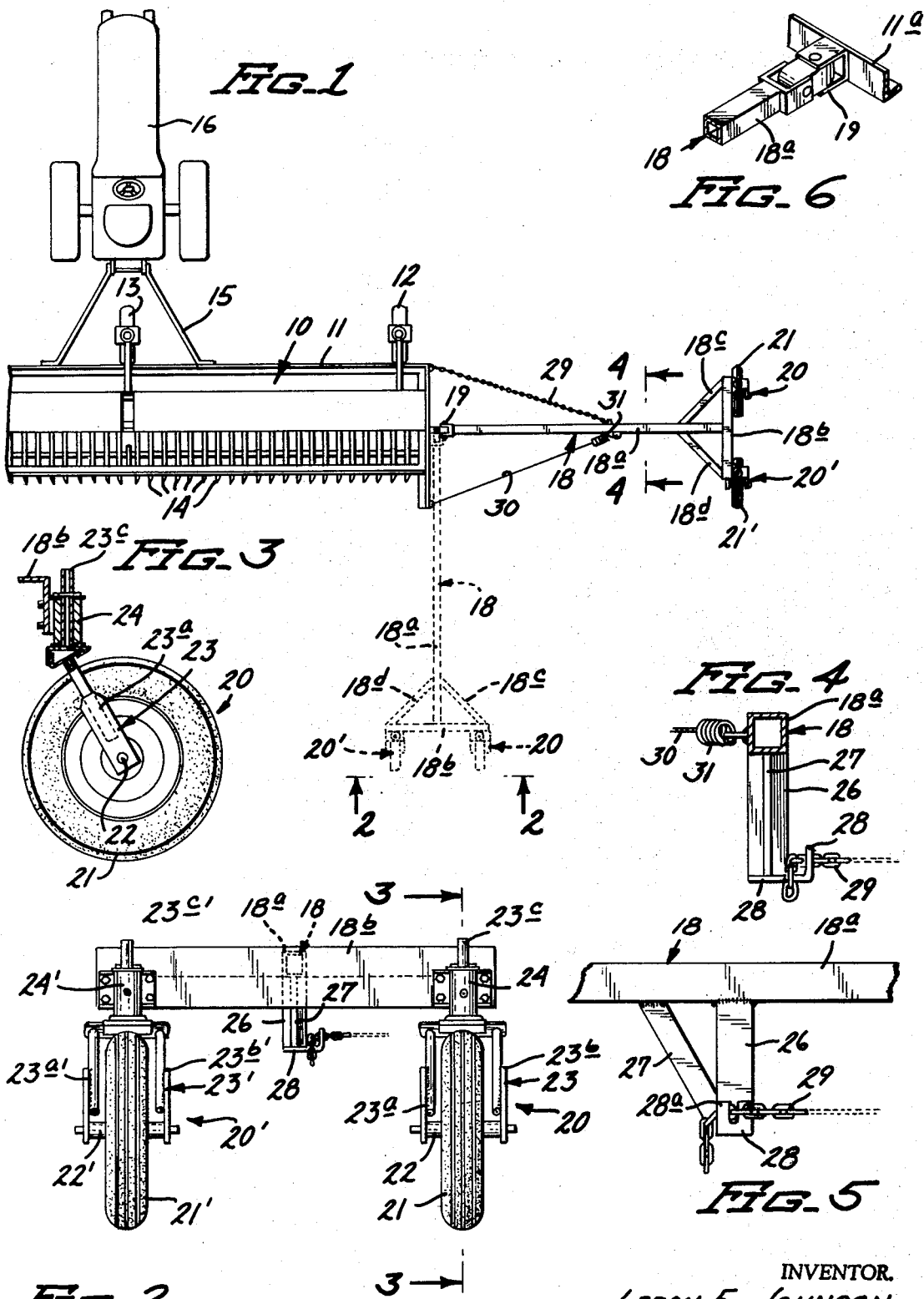

MARKER FOR FARM IMPLEMENT

BACKGROUND OF THE INVENTION

1. Field of the Invention

This invention relates generally to the field of farm implements and more particularly relates to a row marker or spacing device for ground working implements.

2. Description of the Prior Art

When planting grain or row crops, or when field cultivating or plowing, the field is covered by making many rounds with the implement being used. It has been common practice in the prior art to provide means for making a mark for the tractor to follow on the next round. For example, the Haas U.S. Pat. No. 2,362,693 that issued Nov. 14, 1944 discloses a marker having a disk-like marking element rotatably secured to the end of the marker arm. The marker arm is hinged to the implement so that the marker can be raised to an inoperative position when not in use. The Graham et al. U.S. Pat. No. 3,139,941 that issued July 7, 1964 discloses a spade-like or tooth-like marker element mounted on the end of the marker arm.

When smaller or narrower machines were being used, the relatively short marker caused very few problems. However, as fields and machines have become larger and wider, the length and weight of the marker have increased accordingly. For example, if a 24 foot grain drill is being pulled at its center by a tractor 8 feet wide, a front wheel of the tractor must be kept exactly 8 feet from the previous round in order to eliminate overlaps and skips. This distance is very difficult to estimate without a marker and the job becomes very tedious and tiresome if a marker is not used. A marker 12 feet long, however, with a disk or dragging tooth making the required mark at the end thereof causes several problems. The extra weight of the marker itself causes the disk or tooth to run too deeply in the ground. This places extra stress upon the farm implement and upon the connections between the farm implement and the marker. Perhaps the most difficulty occurs with prior art markers at the time the implement is turning to avoid obstructions or to change direction at the end of the field. When the implement turns a corner, the marker is normally on the inside of the corner and thus travels a shorter distance than the implement. If a sharp corner is turned, the marker element may have to reverse its direction in order to follow the implement. If the marker is long and heavy, and especially when the soil is soft, the prior art marker elements can very easily be broken off at this point. Drill hitches are now made as wide as 60 feet and cultivators are manufactured in widths over 80 feet. A marker 30 or 40 feet long becomes very heavy and in fact too heavy to be supported satisfactorily by a disk-type or tooth-type marker element without causing damage to the system during normal operation of the unit. Further, if the marker is to be folded away to an inoperative position when not in use, the increased weight on the farm implement becomes a problem.

SUMMARY OF THE INVENTION

The present invention comprises a marking or spacing device attached to the side of the implement by means of a universal joint so that it can be moved between an operative, marking position and an inoperative, trailing position. The remote end of the spacer bar is T-shaped and is supported by a pair of caster wheel assemblies mounted thereon. Each of the caster wheels is freely rotatable about a vertical axis and the caster wheels also rotate freely over the ground to support the weight of the marking unit. The caster wheels roll freely over the surface of the ground and make the mark to be followed by the tractor on the next round. Because each of the wheels caster a complete 360°, no difficulties are encountered in turning a corner on the field or in going around wet spots or other obstacles. Further, no difficulties are encountered in traveling through back sloped drainage ditches, because the marker is completely flexible up and down about its connection with the implement. The present invention can be manufactured or designed to be adjustable to different widths of machines or it can be sized to fit a particular machine. The rubber tired caster wheels cause very little friction thus reducing the trailing weight of the marker, even where the marker is 30 or 40 feet long. When not in use, the marker can be moved to a trailing position without increasing the load on the implement. When used on planters or drills where seeding is done from one side of the field, two of these markers can be used, one on each side, as described herein.

BRIEF DESCRIPTION OF THE DRAWINGS

FIG. 1 is a top plan view of a grain drill and tractor, the grain drill having the row marker of the present invention attached to one side thereof in an operative position (the inoperative or trailing position being shown in phantom), portions thereof being broken away;

FIG. 2 is an enlarged fragmentary view taken generally along line 2—2 of FIG. 1 showing the trailing position of the marker unit in full lines;

FIG. 3 is a sectional view of a caster wheel assembly taken generally along line 3—3 of FIG. 2;

FIG. 4 is an enlarged fragmentary view of the connection between the spacer bar and chain, taken along line 4—4 of FIG. 1, portions thereof being shown in section;

FIG. 5 is a front plan view of the chain connection shown in FIG. 4; and

FIG. 6 is an enlarged view in perspective of the universal joint connecting the spacer bar to the implement.

DESCRIPTION OF THE PREFERRED EMBODIMENT

Referring now to the drawings, wherein like reference numerals are used throughout the several views to indicate like elements of the invention, there is disclosed in FIG. 1 a grain drill 10 having a mobile frame 11 supported by a plurality of wheels 12, 13 at the front and a larger plurality of press wheels 14 at the rear thereof. A hitch member 15 is attached to the front of frame 11 at its center. The grain drill 10 is being pulled by a tractor 16 in the normal fashion. Although a grain drill is shown in the drawings, it will be appreciated that the row marker of the present invention could be used with any type of ground working implement requiring a marking device.

Frame 11 includes a pair of spaced side frame members, one of which, identified as 11a, is shown. A T-shaped spacer bar 18 is provided having an elongated spacer portion 18a and a wheel mounting portion 18b connected perpendicular to the spacer portion. A pair of braces 18c and 18d are connected between the opposite ends of wheel mounting portion 18b and the spacer portion 18a to rigidize the T-shaped member 18. The other end of spacer portion 18a is connected to side frame member 11a adjacent the center thereof by a universal joint 19. Universal joint 19 operates in the usual fashion to permit spacer bar 18 to pivot either upwardly and downwardly or forwardly and rearwardly with respect to the side frame member 11a.

Operatively connected to the forward end and the rear end of wheel mounting portion 18b are a pair of caster wheel assemblies 20 and 20'. In describing the two caster wheel assemblies, the same numbers will be used, but the numbers identifying the elements of the rear caster wheel assembly will be accompanied by the prime designation. Referring now to FIGS. 2 and 3, it can be seen that caster wheel assembly 20 includes a rubber tired wheel 21 mounted on an axle 22 for rotation about a generally horizontal axis between a pair of depending legs 23a and 23b of a yoke member 23 having a single upwardly extending mounting shaft 23c. Mounting shaft 23c is mounted for rotation about a generally vertical axis in a bearing 24 that is bolted to the outwardly facing side wall of wheel mounting portion 18b. The ground engaging marker wheels 21 and 21' are thus free to rotate over the ground with their axles 22 and 22' and both are free to rotate in a full circle with their vertical mounting shafts 23c and 23c' in the usual caster wheel or crazy wheel fashion.

With this construction, spacer bar 18 is supported at one end by universal joint 19 and at the other end by the two caster wheel assemblies 20 and 20'. Spacer bar 18 thus is normally positioned in a plane generally parallel to the ground surface and is free to move upwardly and downwardly to follow the terrain.

As shown in FIGS. 4 and 5, a downwardly extending bracket member 26 is connected to spacer portion 18a generally intermediate the ends thereof. A brace 27 is connected between the bottom end of bracket member 26 and a position on spacer portion 18a spaced a short distance from its connection with bracket member 26 to give added strength to bracket member 26. Mounted on the bottom end of bracket member 26 is a plate 28 having a flat portion 28a extending upwardly at the front thereof generally parallel to bracket member 26 and spaced therefrom. A vertical slot 28b is provided in flat portion 28a as shown in FIG. 5. A link chain 29 is secured at one end to the front end of side frame member 11a and at its other end one of its links is inserted into slot 28b, the slot being sufficiently narrow to prevent the chain from being pulled therethrough. With chain 29 being secured in slot 28b as shown in FIG. 5, the marking unit or assembly is held in an operative, marking position as shown in full lines in FIG. 1. If the rear end of chain 29 is released from the slot, the marker unit is free to move to a trailing position shown in dotted lines in FIG. 1. Chain 29 and plate 28 thus cooperate to form a releasable connector means to releasably hold the row marker in a marking position with respect to the implement. Another type of flexible tie member such as a flexible cable could be used in place of the chain 29. Further, other means of releasably connecting the chain to the spacer bar or implement could be provided. However, the connector means as shown in FIG. 5 does permit adjustment of the position of the row marker with respect to the implement. By positioning a different link of chain 29 in the slot 28b, the angle between spacer bar 18 and side frame member 11a can be adjusted. If desired, a longer chain could be used so as to permit the marker unit to move rearwardly to a position intermediate the full line and dotted line positions shown in FIG. 1. In such an intermediate position, the marker would have a shorter effective length and thus could be used with implements of smaller width. This same adjustment feature can also be used to accommodate different tractor widths. In the preferred form of the invention, spacer portion 18a is mounted perpendicular to side frame member 11a so that the two wheels 21 and 21' run in the same track. If the chain were lengthened to permit the marker unit to trail in an intermediate position, the two wheels 21 and 21' would form two separate but parallel tracks. However, it would be a simple matter for the tractor operator to follow the appropriate track.

The purpose of providing the downwardly extending bracket member 26 with the chain connecting plate 28 being located at the bottom end thereof, is to reduce torque on the spacer portion 18a. Under normal operating conditions with the marker in the full line position of FIG. 1, and as viewed from the right end thereof, the caster wheel assemblies will tend to exert a torque on spacer portion 18a causing it to twist in a clockwise direction. By connecting the chain to the bottom of bracket member 26, however, an opposite torque is established to balance out and eliminate all twisting of the spacer bar.

A second flexible connector member 30, in this case a flexible cable having a coil spring 30a attached to one end thereof is connected between spacer bar 18 and the rear end of side frame member 11a. As shown in FIG. 4, a small hook member 31 is welded to spacer portion 18a near its connection with bracket member 26. The free end of spring 30a is connected to hook member 31. The purpose of this second connector means is to prevent forwardly swinging movements of the row marker with respect to the implement during operational use thereof. If, for example, grain drill 10 were moving down hill, the row marker would tend to swing forwardly about universal joint 19 in the absence of second connector member 30.

The marker of the present invention can be attached to grain drills, field cultivators, planters, plows or to any machine where a marker is needed. After the initial mounting, the unit can be disconnected by removing one bolt from the universal joint 19 and by unhooking chain 29 and connector member 30. During operation of this assembly, the two caster wheels easily carry the marker over the ground surface without catching obstructions or digging deeply into the ground. When the tractor and grain drill reach a corner and begin to turn, the caster wheels will quickly rotate to a position where the marker can reverse its direction of movement without gouging into the soil or otherwise causing severe strains to be developed in the marker assembly. If desired, spacer portion 18a can be constructed as a telescoping member so that the same marker can be used on implements of considerably different widths. In general, the present invention provides a very accurate and trouble-free marker suitable for use with many different types of farm implements.

What is claimed is:

1. A row marker for a ground working implement having a mobile frame of predetermined width, said mobile frame having spaced side frame means, comprising:
 a. spacer bar means of predetermined length, having first and second ends, said spacer bar means including an elongated spacer portion and a wheel mounting portion connected at said second end substantially perpendicular to said spacer portion, said wheel mounting portion having a forward end and a rear end;
 b. universal joint means for securing said first end of said spacer bar means to one of said side frame means;
 c. a pair of casters each comprising a ground engaging marker wheel rotatable in a caster frame about a generally horizontal axis;
 d. means mounting one of said caster frames on each of said ends of said wheel mounting portion for rotation about a generally vertical axis; and
 e. releasable connector means extending between said mobile frame to said spacer bar means to releasably hold said row marker in a marking position with respect to the implement, said row marker when released being pivotable about said universal joint means to an implement trailing position.

2. The apparatus of claim 1 wherein said spacer bar means is a T-shaped member positioned in a plane generally parallel to the ground surface.

3. The apparatus of claim 1 wherein said spacer portion has a downwardly extending bracket member mounted generally intermediate the ends thereof, said connector means being connected to the lower end of said bracket member.

4. A row marker for a ground working implement having a mobile frame of predetermined width, said frame having spaced side frame means, comprising:
 a. a T-shaped spacer bar of predetermined length, having first and second ends, said spacer bar including an elongated spacer portion and a wheel mounting portion connected at said second end substantially perpendicular to said spacer portion, said wheel mounting portion having a forward end and a rear end;
 b. means for pivotally securing said first end of said spacer bar to one of said side frame means to permit upward and downward pivotal movements of said spacer bar;
 c. a pair of ground engaging caster wheel; and
 d. means mounting said caster wheels on said forward and rearward ends of said wheel mounting portion to support said T-shaped spacer bar in a plane generally parallel to the ground surface.

* * * * *